(12) United States Patent
Salah et al.

(10) Patent No.: US 10,906,812 B1
(45) Date of Patent: Feb. 2, 2021

(54) METHODS OF PRODUCING CARBON NANOPARTICLES

(71) Applicant: King Abdulaziz University, Jeddah (SA)

(72) Inventors: Numan Abdullah Ahmed Salah, Jeddah (SA); Yousef Noman Abdullah Salah, Jeddah (SA); Ahmed Salem Ahmed Alshahrie, Jeddah (SA)

(73) Assignee: KING ABDULAZIZ UNIVERSITY, Jeddah (SA)

( * ) Notice: Subject to any disclaimer, the term of this patent is extended or adjusted under 35 U.S.C. 154(b) by 0 days.

(21) Appl. No.: 16/997,095

(22) Filed: Aug. 19, 2020

(51) Int. Cl.
*C01B 32/05* (2017.01)
*B02C 19/18* (2006.01)

(52) U.S. Cl.
CPC .............. *C01B 32/05* (2017.08); *B02C 19/18* (2013.01); *C01P 2002/01* (2013.01); *C01P 2002/85* (2013.01); *C01P 2004/03* (2013.01); *C01P 2004/04* (2013.01); *C01P 2004/64* (2013.01)

(58) Field of Classification Search
CPC ..... C01B 32/05; B02C 19/18; C01P 2004/64; C01P 2002/01; C01P 2004/04; C01P 2004/03; C01P 2002/85
See application file for complete search history.

(56) References Cited

U.S. PATENT DOCUMENTS

| | | |
|---|---|---|
| 9,346,678 B1 | 5/2016 | Alshehri et al. |
| 9,861,675 B1 | 1/2018 | Al-Jaouni et al. |
| 9,896,342 B1 | 2/2018 | Alshatwi et al. |
| 2020/0056086 A1 | 2/2020 | Haq et al. |

FOREIGN PATENT DOCUMENTS

ID 201708236 A 8/2017

OTHER PUBLICATIONS

Kavitha, et al., Turning date palm fronds into biocompatible mesoporous fluorescent carbon dots, Scientific Reports 2018; 8: 16269, pp. 1-10 (Year: 2018).*
Cheng, et al., Ultrasound-Assisted SWNTs Dispersion: Effects of Sonication Parameters and Solvent Properties, J. Phys. Chem. C 2010; 114: 8821-8827 (Year: 2010).*
Tedjani, et al., Crude Oil Sensing using Carbon Nanostructures Synthesized from Phoenix Dactylifera L. Cellulose, Scientific Reports 2019; 9: 17806, pp. 1-7 (Year: 2019).*
Garrigue, et al., Top-Down Approach for the Preparation of Colloidal Carbon Nanoparticles, Chem. Mater. 2004; 16: 2984-2986 (Year: 2004).*
Zhou, et al., Facile synthesis of fluorescent carbon dots using watermelon peel as a carbon source, Materials Letters 2012; 66: 222-224 (Year: 2012).*
Aziz et al: "A Simple and Direct Preparation of a Substrate-Free Interconnected Nanostructured Carbon Electrode from Date Palm Leaflets for Detecting Hydroquinone", Chemistry Select, vol. 2, pp. 4787-4793, 2017.
Mohammed et al: "Date palm kernel-based GAC and its dynamic modeling of residual chlorine breakthrough curve in multimedia filter", Journal of Southeast University, vol. 28, No. 2, pp. 169-174, Jun. 2012.

* cited by examiner

*Primary Examiner* — Daniel C. McCracken
(74) *Attorney, Agent, or Firm* — W&C IP

(57) ABSTRACT

A method of producing carbon nanoparticles, comprising milling carbonized date palm fronds to produce a milled powder; dispersing the milled powder in a liquid to form a suspension; sonicating the suspension to form the carbon nanoparticles; and collecting the carbon nanoparticles is provided.

27 Claims, 12 Drawing Sheets

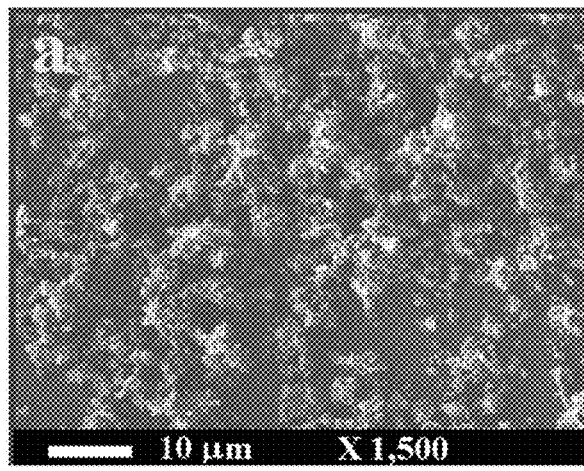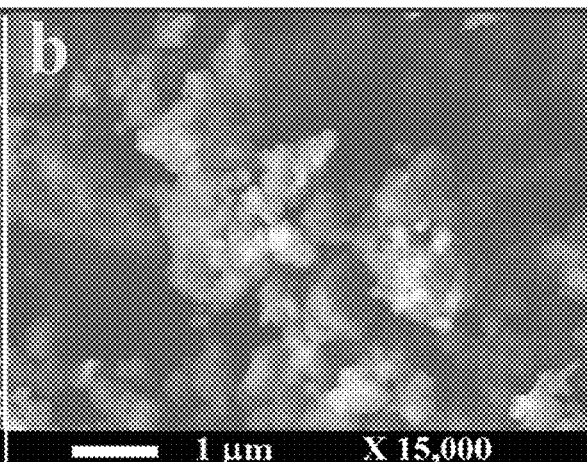
FIG. 4A  FIG. 4B
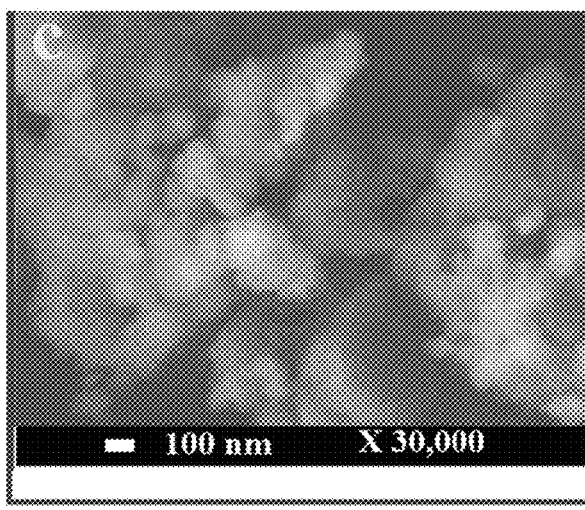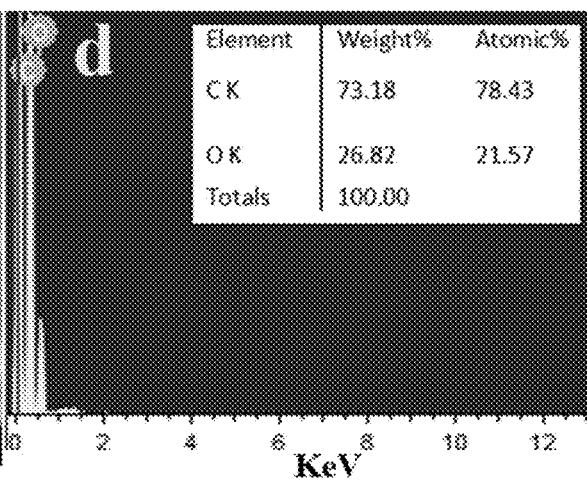
FIG. 4C  FIG. 4D

FIG. 6A                                    FIG. 6B

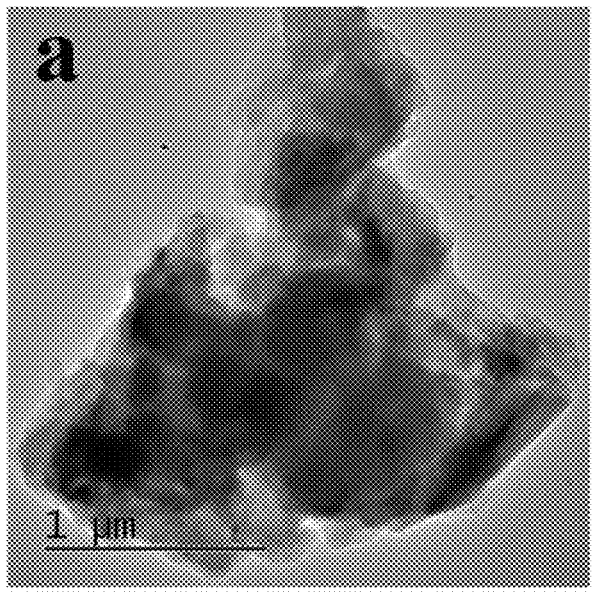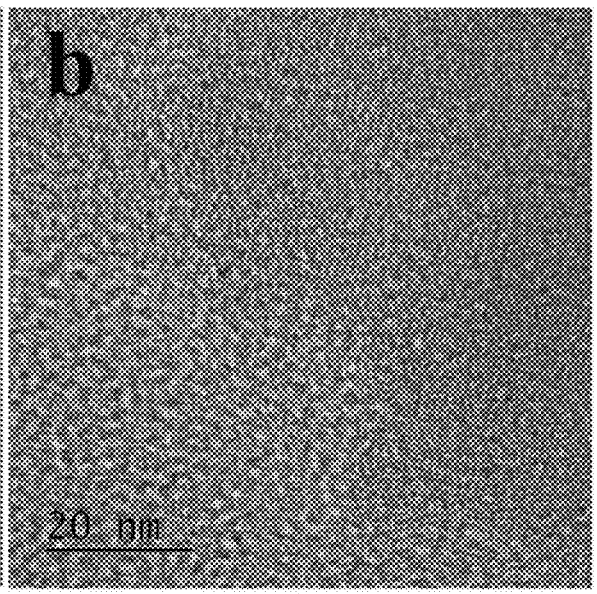
FIG. 7A  FIG. 7B
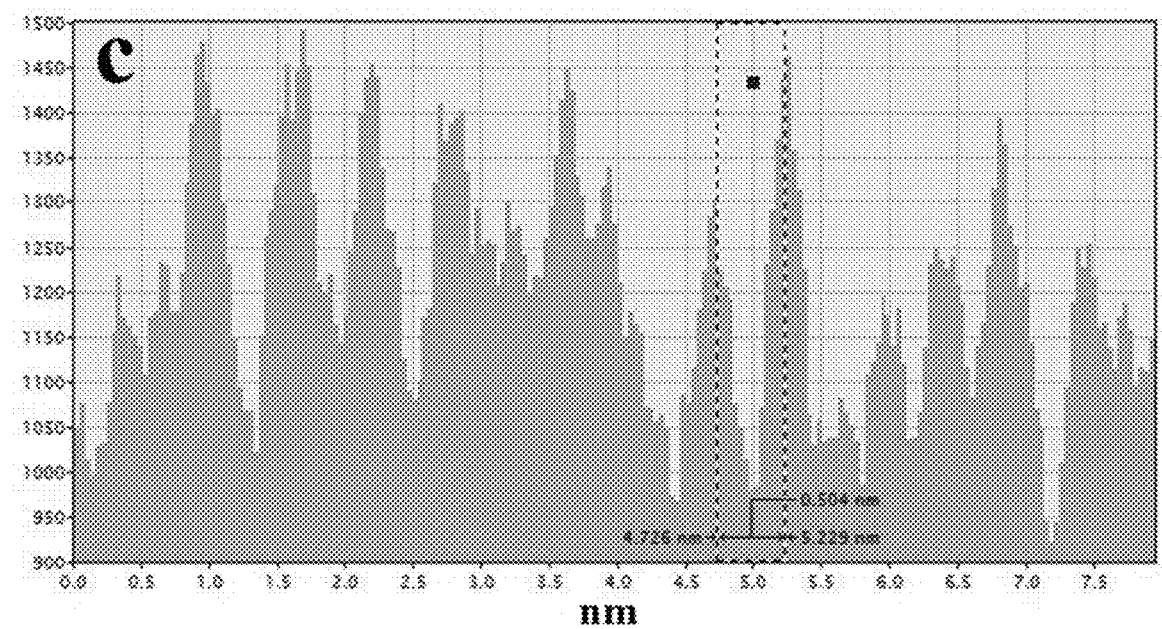
FIG. 7C

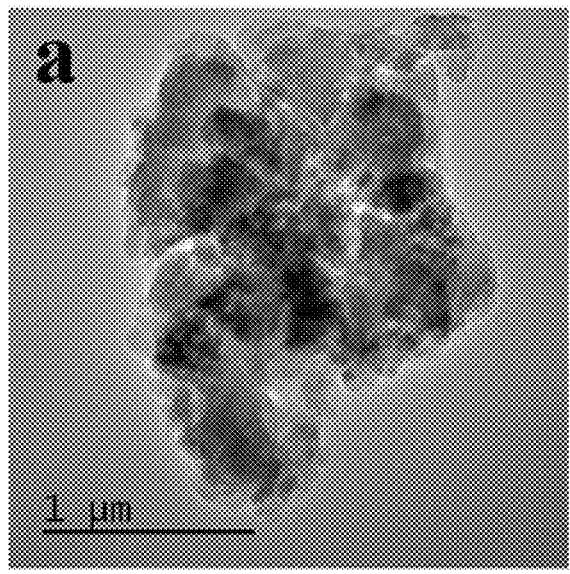
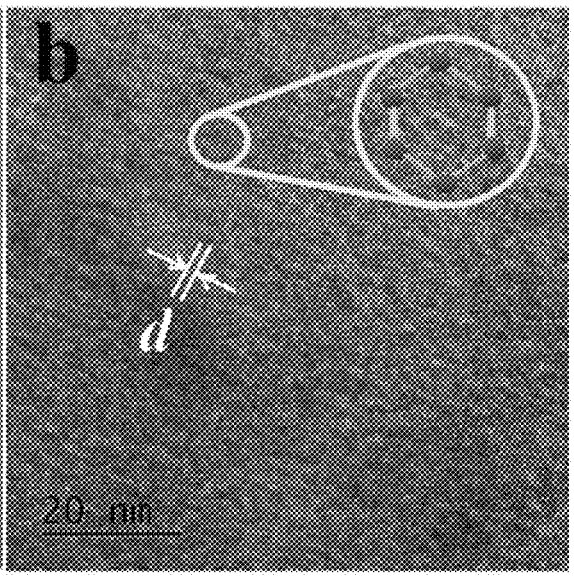
FIG. 8A  FIG. 8B
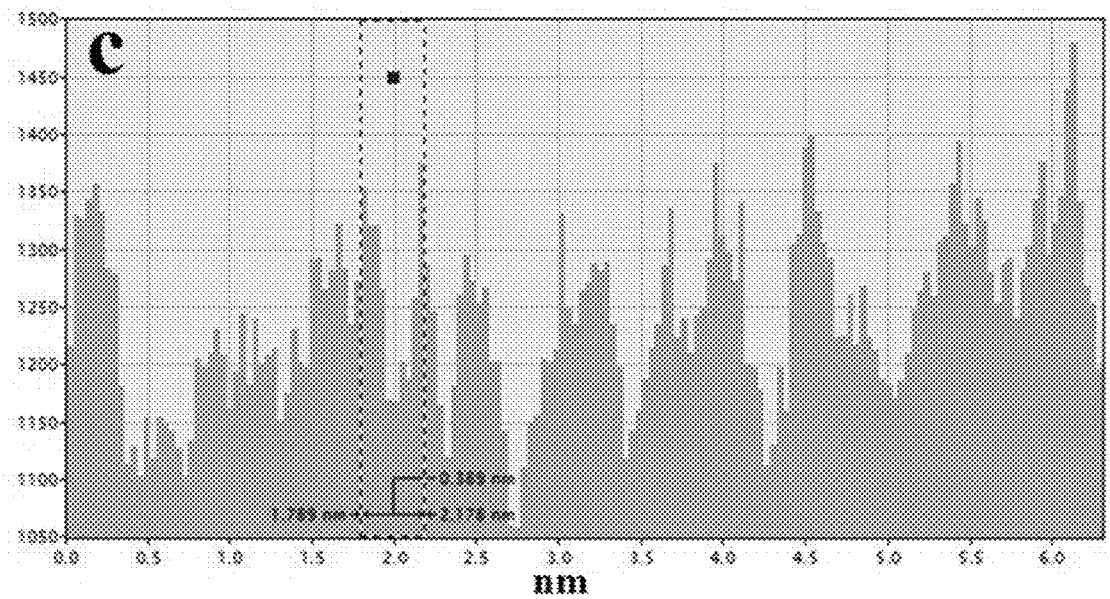
FIG. 8C

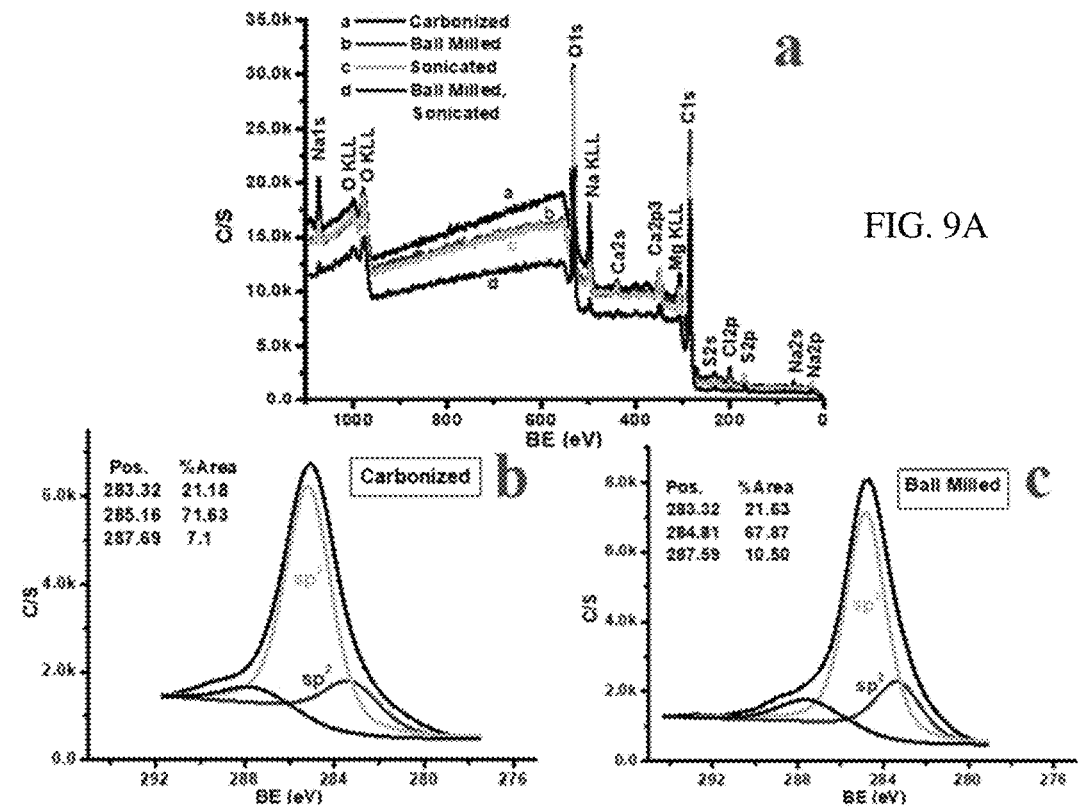
FIG. 9A
FIG. 9B
FIG. 9C
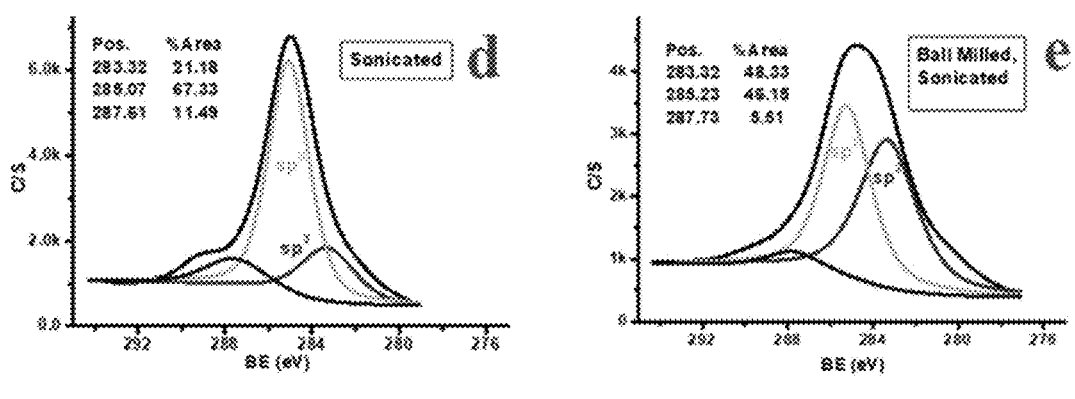
FIG. 9D
FIG. 9E

METHODS OF PRODUCING CARBON NANOPARTICLES

FIELD OF THE INVENTION

The invention is generally related to methods of producing ultrafine carbon nanoparticles from carbonized date palm fronds using high energy ball milling followed by high power sonication.

BACKGROUND OF THE INVENTION

Dates are an important fruit/crop in many countries mainly in the middle east. The world total number of date palms was estimated to be more than 120 million [1]. For example, in Saudi Arabia there are more than 30 million different date palm trees [2]. In this country, around 200,000 tons of fronds/biomass were produced every year due to the pruning process of date palm trees [3]. This has a harmful effect on the environment due to the accumulation of waste and this also has very little economic value. The agricultural by-product has been considered as a good and abundant source of several raw materials, however, this by-product has not been previously utilized to produce valuable ultrafine carbon nanostructures, which can be used for several applications.

The most common structures made of carbon are carbon nanotubes, graphene, Fullerene ($C_{60}$), carbon fiber, activated carbon, black carbon and diamond. These structures have several applications and are produced from different sources using many techniques. Carbon sources are mainly limestones, dolomites and carbon dioxide. In addition, significant quantities of carbon occur in organic deposits of oil, coal, peat, and methane clathrates. Carbon forms millions of compounds, which is more than any other element. This has given carbon the name "king of the elements" [4]. Carbon-based structures are the most multipurpose materials used in several fields. For example, it is used in environmental science for water and air purification and remediation. It is also useful for renewable energy to generate and store energy [5]. Many applications of carbon are already well established. To ensure the continuity of these and other applications, the sustainability of carbon sources is quite important. There is a need to find out a sustainable source for carbon. This might be achieved by utilization of natural, abundant and more renewable precursors.

Different research groups have tried to convert date palm fronds to useful materials like activated carbon. For example, Yacob et al [6] prepared the activated carbon by treating the date palm fronds with different concentrations of $H_3PO_4$ then carbonizing the samples at 400° C. for 3 hrs. Ahmad et al [7] produced the ash by heating the fronds in the muffle furnace at 500° C. for 3 hrs followed by the activation process using NaOH. The produced activated carbons were tested as absorbing material for brilliant green dye. Hussein et al [8] prepared the activated carbon by mixing the collected fronds with appropriate activator with proper percentages then the prepared material was heated at 700° C. in a graphite furnace for 1 hr under an inert atmosphere. The prepared activated carbon was tested as an absorbent dye model. Ashfaq Ahmad et al [9] produced the activated carbons from the date palm fronds waste by chemical activation using KOH, $H_3PO_4$, and $ZnCl_2$. They studied the effect of different carbonization time and temperature and different concentrations of activating agents on the morphology and surface area.

However, the limitation of the previous studies was the size of the prepared carbonized particles. Indeed, the carbon materials were produced in bulk and at the micro-scale level, which results in a small surface area.

SUMMARY

The present disclosure provides methods of producing carbon particles at the nanoscale level with a high surface area that are suitable for different types of applications. Using natural materials of agriculture origin for the synthesis of carbon materials is environmentally safe and generally less expensive as compared to using non-natural materials. Embodiments of the disclosure utilize date palm fronds as a source of carbon nanomaterials to be used for different applications such as water treatment, filters and air purification, plastic and rubber additives, fuel and lubricated additives, energy storage, gas adsorption, fertilizers, valuable metals mining, bio imaging, and drug delivery.

An aspect of the disclosure provides a method of producing carbon nanoparticles, comprising milling carbonized date palm fronds to produce a milled powder; dispersing the milled powder in a liquid to form a suspension; sonicating the suspension to form the carbon nanoparticles; and collecting the carbon nanoparticles. In some embodiments, the carbonized date palm fronds are produced by heating date palm fronds to 300 to 500° C. for 2 to 8 hours.

In some embodiments, the carbonized date palm fronds are milled for 1 to 10 hours. In some embodiments, the liquid is water. In some embodiments, the milled powder is present in the suspension in an amount of 10 g/L to 100 g/L.

In some embodiments, the sonication is performed with a probe sonicator at a power of 175 to 250 W. In some embodiments, the sonication is performed for 1 to 5 hours.

In some embodiments, the carbon nanoparticles have a mean primary particle size of 50 to 150 nm, e.g. less than about 150 nm or less than about 100 nm. In some embodiments, the carbon nanoparticles comprise carbon, oxygen, and other elements selected from the group consisting of sodium, calcium, sulfur, chlorine, magnesium, and hydrogen. In some embodiments, a sum of an amount of carbon present in the carbon nanoparticles and an amount of oxygen present in the carbon nanoparticles is greater than 95.75 atom % based on a total number of atoms in the carbon nanoparticles by X-ray photoelectron spectroscopy (XPS). In some embodiments, the carbon nanoparticles are crystalline and have a mean lattice spacing of 0.30 to 0.45 nm by transmission electron microscopy. In some embodiments, the carbon nanoparticles have a ratio of $sp^2$ carbon to $sp^3$ carbon of 1:0.5 to 1:1.5 by XPS.

BRIEF DESCRIPTION OF THE DRAWINGS

FIGS. 4A-D. (a-c) SEM images at different magnifications and (d). Qualitative and quantitative energy dispersive spectroscopy results of the ball milled-sonicated carbonized palm date fronds.

FIGS. 6A-C. (a) TEM and (b) HRTEM images of the ball milled carbonized palm date fronds. (c) Line intensity profile of lattice planes with d=0.535 nm.

FIGS. 7A-C. (a) TEM and (b) HRTEM images of the sonicated carbonized palm date fronds. (c) Line intensity profile of lattice planes with d=0.504 nm.

FIGS. 8A-C. (a) TEM and (b) HRTEM images of the ball milled-sonicated carbonized palm date fronds. (c) Line intensity profile of lattice planes, d=0.389 nm.

FIGS. 9A-E. XPS survey scan of the carbonized, ball milled, sonicated and ball milled-sonicated palm dates fronds (a). XPS of C1s narrow scan of these samples are shown in b, c, d and e, respectively.

DETAILED DESCRIPTION

Figures 1A, 1B:
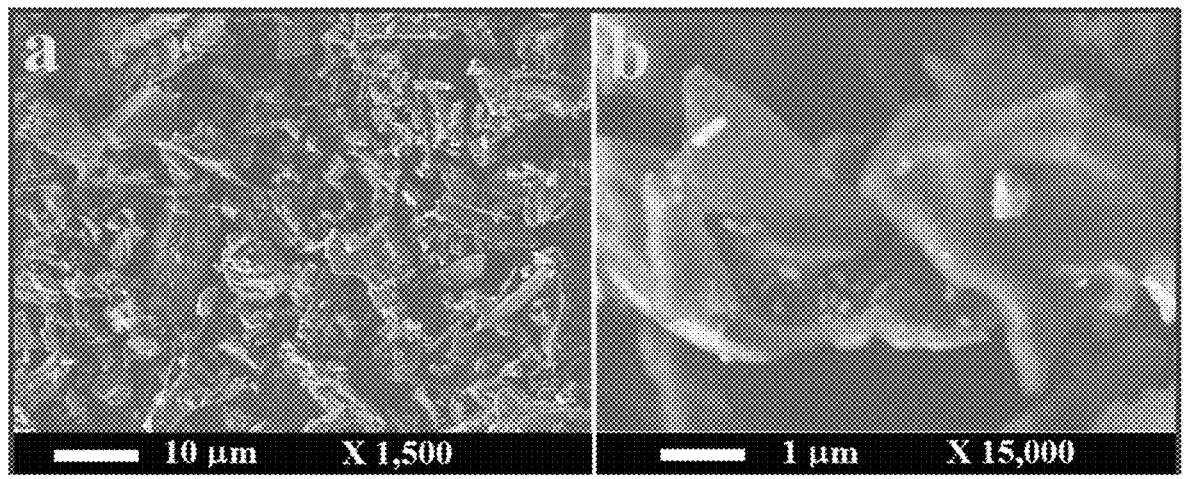
FIGS. 1A-D. (a-c) SEM images at different magnifications and (d) Qualitative-quantitative energy dispersive spectroscopy (EDS) results of the carbonized palm date fronds.
Figures 1C, 1D:
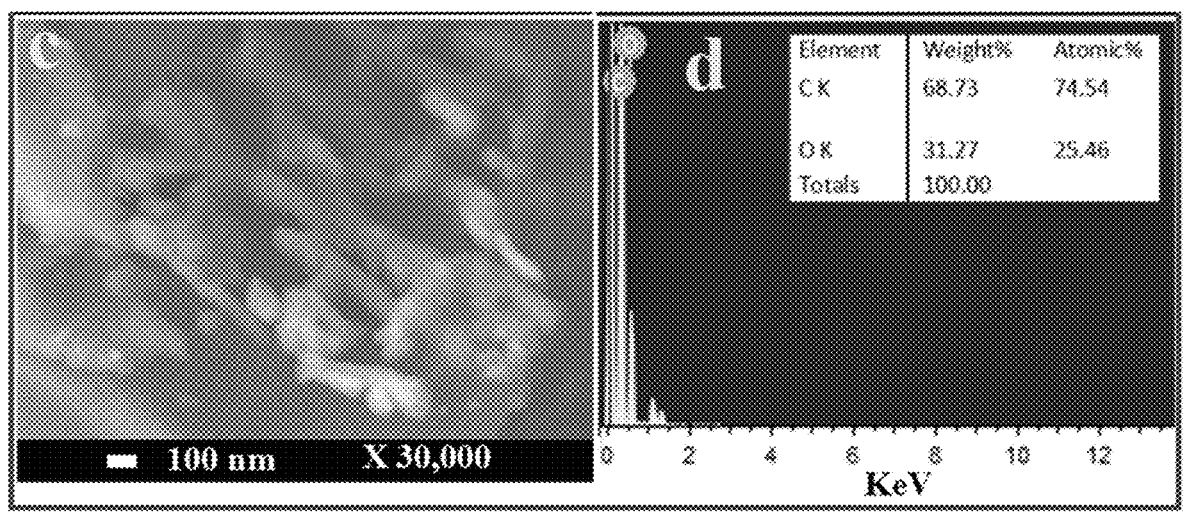
Figures 2A, 2B:
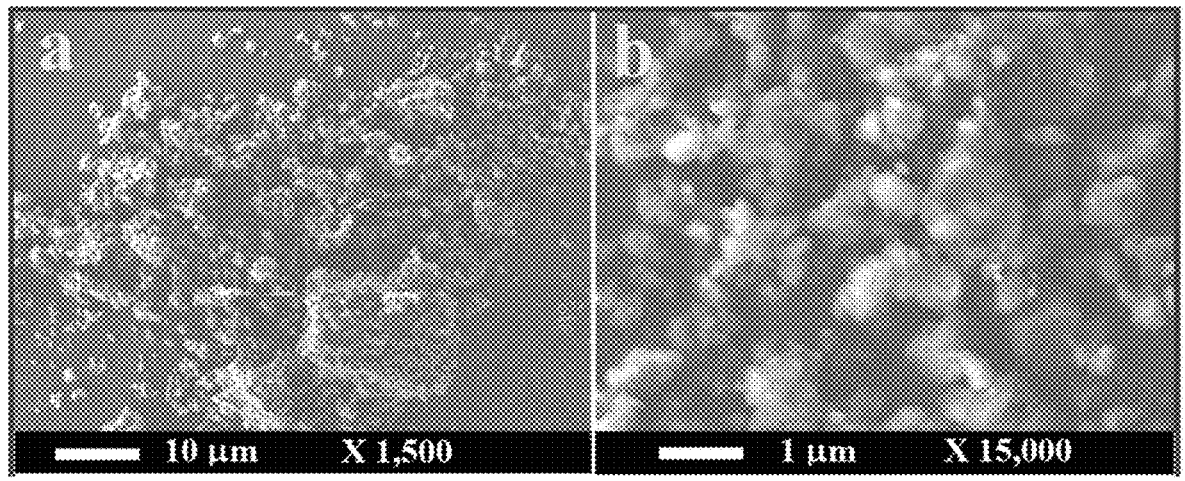
FIGS. 2A-D. (a-c) SEM images at different magnifications and (d) Qualitative-quantitative energy dispersive spectroscopy results of the ball milled carbonized palm date fronds.
Figures 2C, 2D:
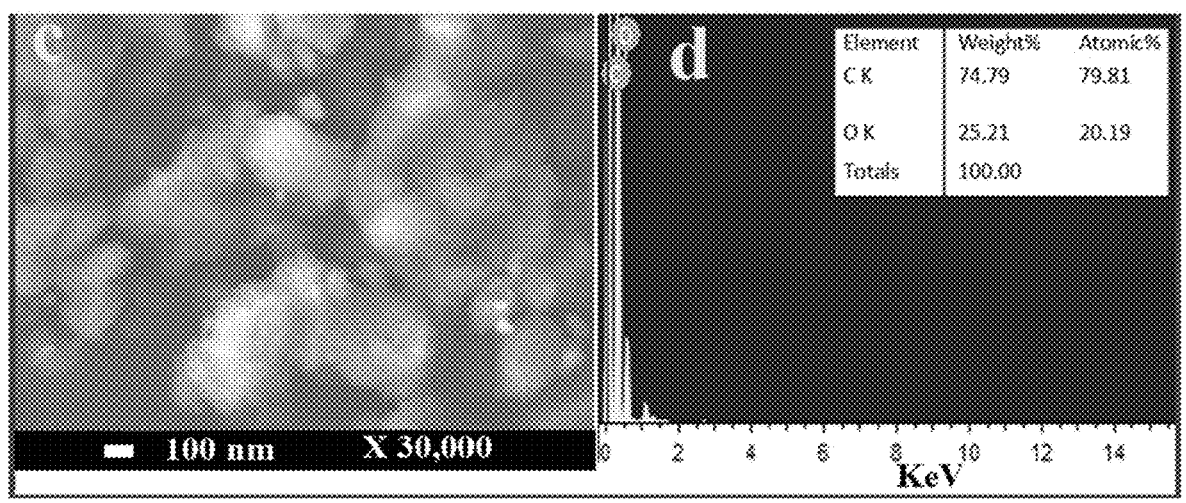
Figures 3A, 3B:
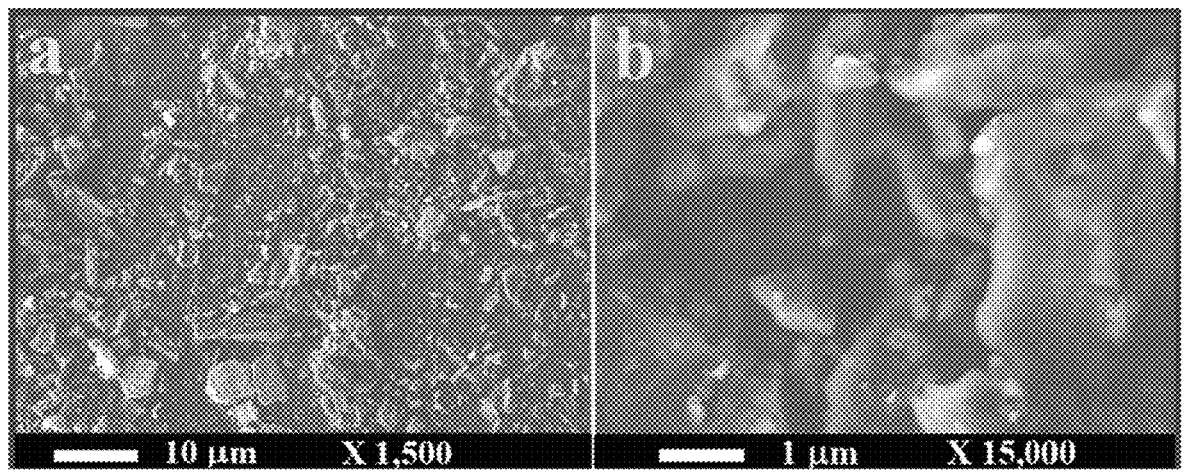
FIGS. 3A-D. (a-c) SEM images at different magnifications and (d) Qualitative-quantitative energy dispersive spectroscopy results of the sonicated carbonized palm date fronds.
Figures 3C, 3D:
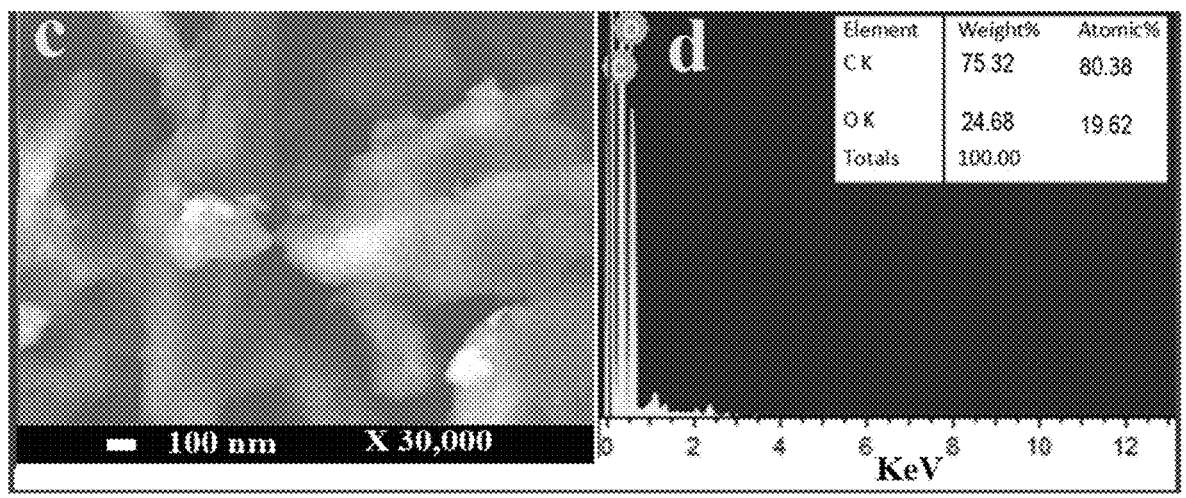

Embodiments of the disclosure provide a method of producing ultrafine carbon nanostructures from carbonized date palm fronds utilizing high energy ball milling followed by high power sonication. The produced ball milled, sonicated ultrafine carbon nanoparticles have several applications including use in water treatment, filters and air purification, plastic and rubber additives, fuel and lubricated additives, energy storage, gas adsorption, fertilizers, valuable metals mining, bio imaging, drug delivery etc.

In some embodiments, the method of producing carbon nanoparticles comprises the steps of milling carbonized date palm fronds to produce a milled powder; dispersing the milled powder in a liquid to form a suspension; sonicating the suspension to form the carbon nanoparticles; and collecting the carbon nanoparticles.

*Phoenix dactylifera*, commonly known as date or date palm, is a flowering plant species in the palm family, Arecaceae, cultivated for its edible sweet fruit. The species is widely cultivated across Northern Africa, the Middle East, the Horn of Africa and South Asia, and is naturalized in many tropical and subtropical regions worldwide. *P. dactylifera* is the type species of genus *Phoenix*, which contains 12-19 species of wild date palms, and is the major source of commercial production.

In some embodiments, the carbonized date palm fronds are produced by heating date palm fronds to 300 to 500° C., e.g. 350-400° C., for 2 to 8 hours, e.g. 4-5 hrs.

High-energy ball milling techniques are known in the art and generally require the use of metallic or ceramic jars and balls. This technique mechanically deforms the solid materials into very fine nanomaterials in powder form. These can be metals or alloys or any other solid structures. The ball milling is normally conducted using rigid balls in a high energy rotating mill, where irregular-grained structures experience deformation as the result of severe cyclic distortion. Small ultrafine particles with sizes less than 10 nm can be produced. This technique can be scaled to produce high quantities (Tons) of nanomaterials. The contamination problem due to the use of metallic jars and balls is resolved by coating with hard-ceramic materials such as tungsten carbide, alumina, or zirconia. In some embodiments, the carbonized date palm fronds are milled for at least 1 to 10 hours, e.g. 5 to 7 hours.

The milled powder is then dispersed in a liquid such as water to form a suspension for sonication. In some embodiments, the milled powder is present in the suspension in an amount of 10 g/L to 100 g/L.

The sonication process reduces the particle size without involving organic solvents or other chemicals. In the sonication process, an ultrasonic bath of high-power sound waves (of alternating high and low pressure) can be used. A probe sonicator can also be employed to apply high sound energy waves to the solution that contains the desired particles. In this technique, electrical signals with a high frequency (e.g. 20 kHz or higher) are converted into a physical vibration to break materials/substances apart into smaller fragments. A higher frequency is preferred to have a stronger reduction on the particle size. An electric generator can generate a signal to power a transducer. A probe sonicator is preferred because continued mixing by a magnetic stirrer is possible. In some embodiments, the sonication is performed with a probe sonicator at a power of at least 175 to 250 W, e.g. at least 200 W. In some embodiments, the sonication is performed for at least 1 to 5 hours, e.g. at least 3 hours.

As shown in the Example, the sonication process was able to convert a large part of the amorphous carbons such as $sp^1$ and $sp^3$ into graphitized $sp^2$ carbons, which is useful to enhance the electrical conductivity of these nanoparticles.

In some embodiments, the carbon nanoparticles have a mean primary particle size of 50 to 150 nm. In some embodiments, the carbon nanoparticles comprise carbon, oxygen, and other elements selected from the group consisting of sodium, calcium, sulfur, chlorine, magnesium, and hydrogen. In some embodiments, a sum of an amount of carbon present in the carbon nanoparticles and an amount of oxygen present in the carbon nanoparticles is greater than 95.75 atom % based on a total number of atoms in the carbon nanoparticles by X-ray photoelectron spectroscopy (XPS). In some embodiments, the carbon nanoparticles are crystalline and have a mean lattice spacing of 0.30 to 0.45 nm by transmission electron microscopy. In some embodiments, the carbon nanoparticles have a ratio of $sp^2$ carbon to $sp^3$ carbon of 1:0.5 to 1:1.5 by XPS.

Before exemplary embodiments of the present invention are described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

The invention is further described by the following non-limiting examples which further illustrate the invention, and are not intended, nor should they be interpreted to, limit the scope of the invention.

EXAMPLE

Summary

Nanostructured carbon materials have outstanding physical, chemical, thermal, and electric properties and are useful for many applications, such as the fabrication of various composite materials like carbon/polymer, carbon/metal, carbon/cement, carbon/alloy and carbon/carbon composites [10-13]. The surface area of the produced particles is an important factor for several applications such as water treatment, filters and air purification, plastic and rubber additives, fuel and lubricated additives, energy storage, gas adsorption, bio imaging, drug delivery etc. However, the high cost and processing charge of carbon nanostructures is still a big challenge. Moreover, the toxicity of some carbon nanomaterials is found to be related to the composition [14]. The source of carbon materials and the catalysts used during the production have a major role on the resulting chemical compositions of the produced nanomaterial. These nanomaterials should have minimum toxicity, especially if it is applied in biology and medicine, particularly as regenerative medicine, drug delivery, imaging, nanobiosensors, etc. [15].

In this Example, high energy ball milling followed by high power sonication was found to be an effective approach for producing ultrafine carbon nanoparticles from carbonized Saudi palm dates fronds.

Methods

The carbonized samples used in this work were produced by heating small pieces (~0.2-0.5 cm) of Saudi date palm fronds at a temperature within the range 350-400° C. for a time of 4-5 hrs. The carbonization took place in a muffle furnace using a closed crucible (with a small hole).

To produce ultrafine carbon nanostructures from carbonized palm dates fronds, three methods are described here.

The first method utilizes only a high energy ball milling technique. Here, a few grams of a carbonized sample was reduced in their particle size by putting them in metallic or ceramic jars along with the corresponding balls of the high energy ball-milling technique. After five to seven hours, the particles are reduced into the nano scale.

In the second method, which utilizes a sonication process, a few grams of the carbonized sample was sonicated using a high power sonication technique in a water media (50-100 ml). The use of a high-power ultrasonic probe for 3 hrs at 200 W and above is quite effective to produce fine nanostructures.

The third method is to use both ball milling and sonication, where the ball milled samples are further sonicated to obtain smaller nanostructures. After 3 hours, the ball milled sample is dispersed in 50-100 ml water and then sonicated for 3 hrs. This provides ultra-fine carbon nanostructures smaller than those produced by the ball milling or sonication process alone.

The samples produced by these methods were characterized by several techniques including SEM, TEM, XPS, XRD, Raman, UV-visible and electrical conductivity.

Results

Figures 5A, 5B:
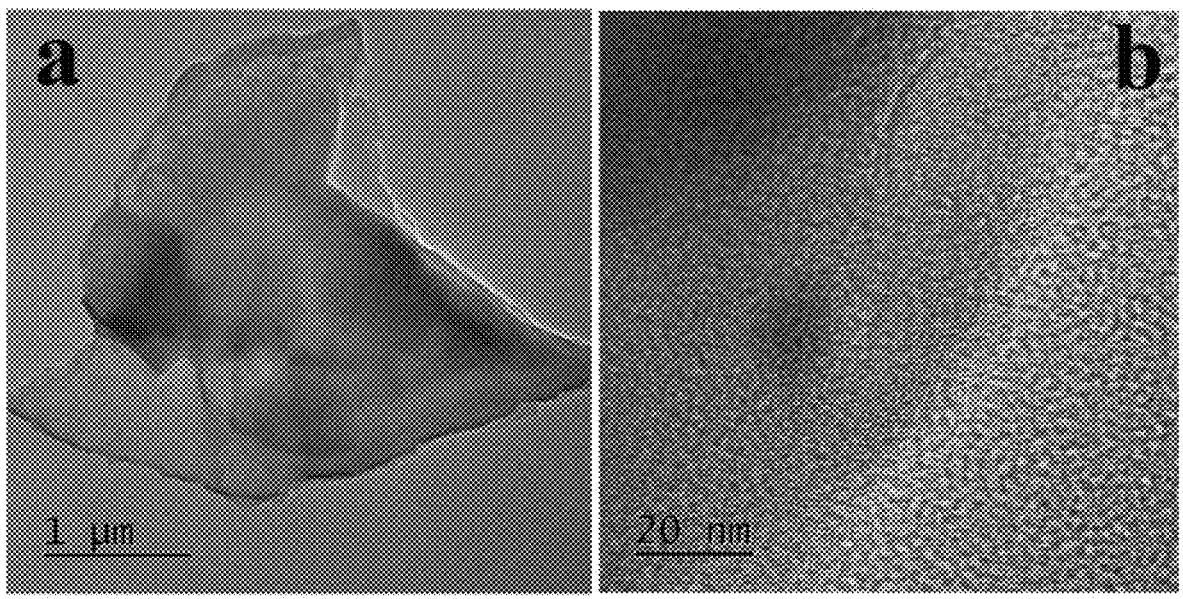
FIGS. 5A-C. (a) TEM and (b) HRTEM images of the carbonized palm date fronds.
(c) Line intensity profile of lattice planes with interlayer spacing=0.242 nm (d-spacing).
Figure 5C:
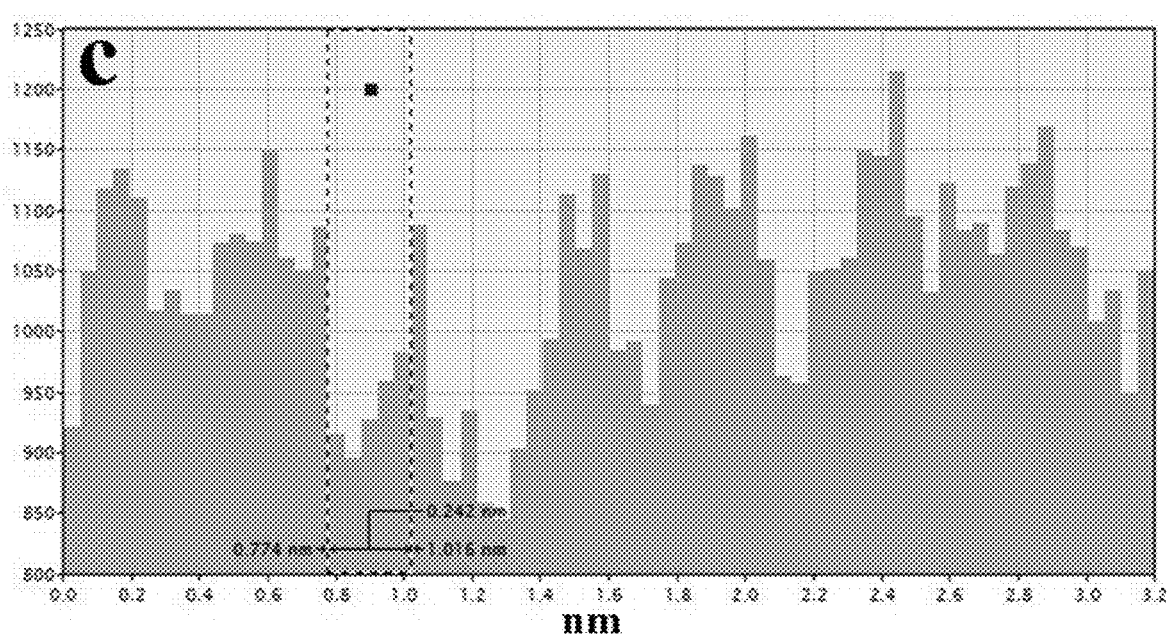

Micro size structures of carbonized palm dates fronds can be seen in the SEM images, while the EDS analysis shows that carbon is the major element, which is around atomic 75% (FIGS. 1A-D). The remaining percentage is of oxides and/or carbonates. Micro sized single particles can be seen in the TEM image, while the HRTEM image shows some short-range hexagonal rings of carbons indicating that the carbonized sample has some graphitic structures (FIGS. 5A-C). This interlayer spacing value is close to that reported in carbon materials, which are varying in a wide range [16].

Figure 6C:
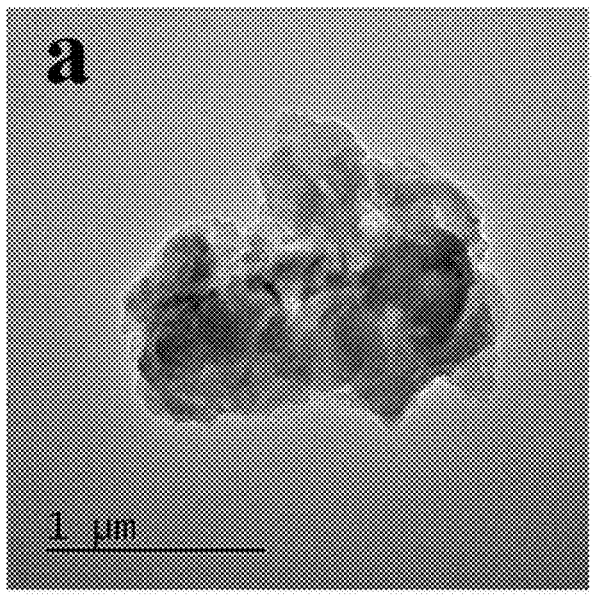
Figure 6C:
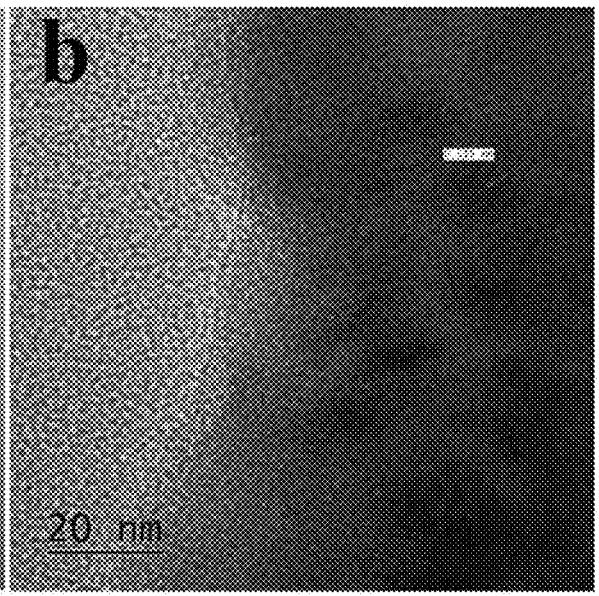
Figure 6C:
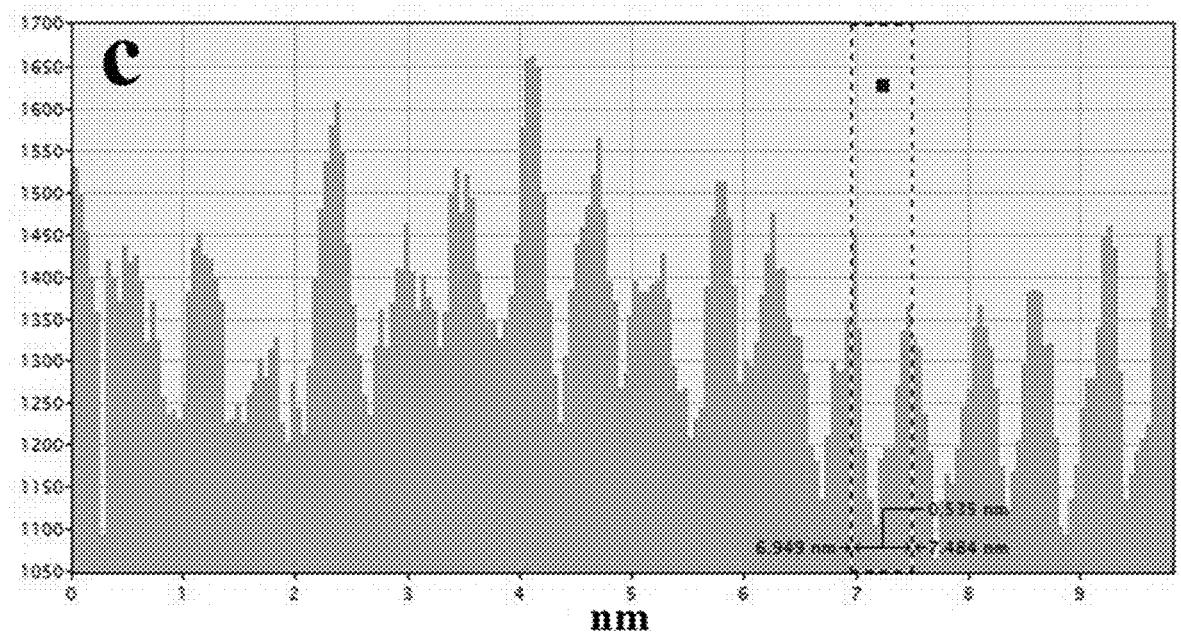

Nano size structures of the ball milled carbonized palm date fronds in individual and cluster forms can be seen in the SEM images, while the EDS analysis shows almost similar results to those of the carbonized sample (FIGS. 2A-D). Carbon is the major element, which is around atomic 80%. The remaining percentage is of oxides and/or carbonates. Cluster of no sized particles can be seen in the TEM image, while the HRTEM image shows some hexagonal ranges of carbons and clear lattices, indicating that the ball milled sample has some graphitic structures (FIGS. 6A-C). This value of d-spacing is also close to those reported in the literature for carbon materials [16].

A mixture of micro, sub micro and nano sized structures of the sonicated carbonized palm date fronds can be seen in the SEM images, while the EDS analysis shows almost similar results to those of the ball milled sample, where carbon is the major element, which is more than atomic 80% (FIG. 3A-D). The remaining percentage is of oxides and/or carbonates. Nanostructures can be seen in a single micro size cluster (FIGS. 7A-C). The HRTEM image shows crystalline structure with hexagonal ranges and clear lattices, indicating that the sonicated sample has improved graphitic structures.

The SEM images of the ball milled-sonicated carbonized palm date fronds show fine nano sized structures, which can be seen in individual and in cluster forms with particles less than 100 nm (FIGS. 4A-D). The EDS analysis shows almost similar results to those of the carbonized sample, where carbon is the major element, which is more than atomic 80%. The remaining percentage is of oxides and/or carbonates. Fine nanostructures can be seen in a single micro size cluster (FIGS. 8A-C), The HRTEM image shows perfect crystalline structure with very clear lattices and hexagonal ranges, indicating that the ball milled, sonicated sample has almost perfect graphitic structures.

The survey scan curves in FIG. 9A show the carbon (C1s) and oxygen (O1s) as the major elements, along with some trace elements like Na, S, Cl, Mg, and Ca. The narrow scans (b-e) show that the carbon atoms are exists in $sp^2$ and $sp^3$ hybridized forms [17]. But the ratio of $sp^2/sp^3$ is increasing mainly by sonication. This ratio is close to 1 for the ball milled-sonicated sample (FIG. 9E). This indicates that sonication of the ball milled sample is a powerful tool to increase the graphitic content of the carbonized palm date fronds sample, mainly by converting some of the $sp^3$ into $sp^2$ carbons.

As shown in Table 1, it is clear that carbon (C1s) and oxygen (O1s) are the major elements, while other trace elements represent around 5-6 Atomic %. It can be observed that these trace elements are reduced in their concentrations by sonication. They can be dissolved in the water medium and provide highly pure carbonized nanostructures (extracted from palm dates fronds).

Table 1: Chemical compositions of the carbonized, ball milled, sonicated and ball milled-sonicated palm dates fronds.

|  | Carbonized (Atomic %) | Ball milled (Atomic %) | Sonicated (Atomic %) | Ball milled, sonicated (Atomic %) |
| --- | --- | --- | --- | --- |
| C1s | 65.7 | 71.8 | 65.0 | 68.0 |
| O1s | 27.6 | 23.8 | 29.2 | 28.5 |
| Na1s | 2.6 | 1.6 | 1.5 | 0.8 |
| Ca2p | 1.8 | 1.3 | 2.6 | 1.4 |
| S2p | 1.1 | 0.7 | 1.1 | 1.2 |
| Cl2p | 1.0 | 0.7 | 0.5 | 0.2 |
| Mg2s | 0.2 | <.1 | <.1 | <.1 |

Figure 10:
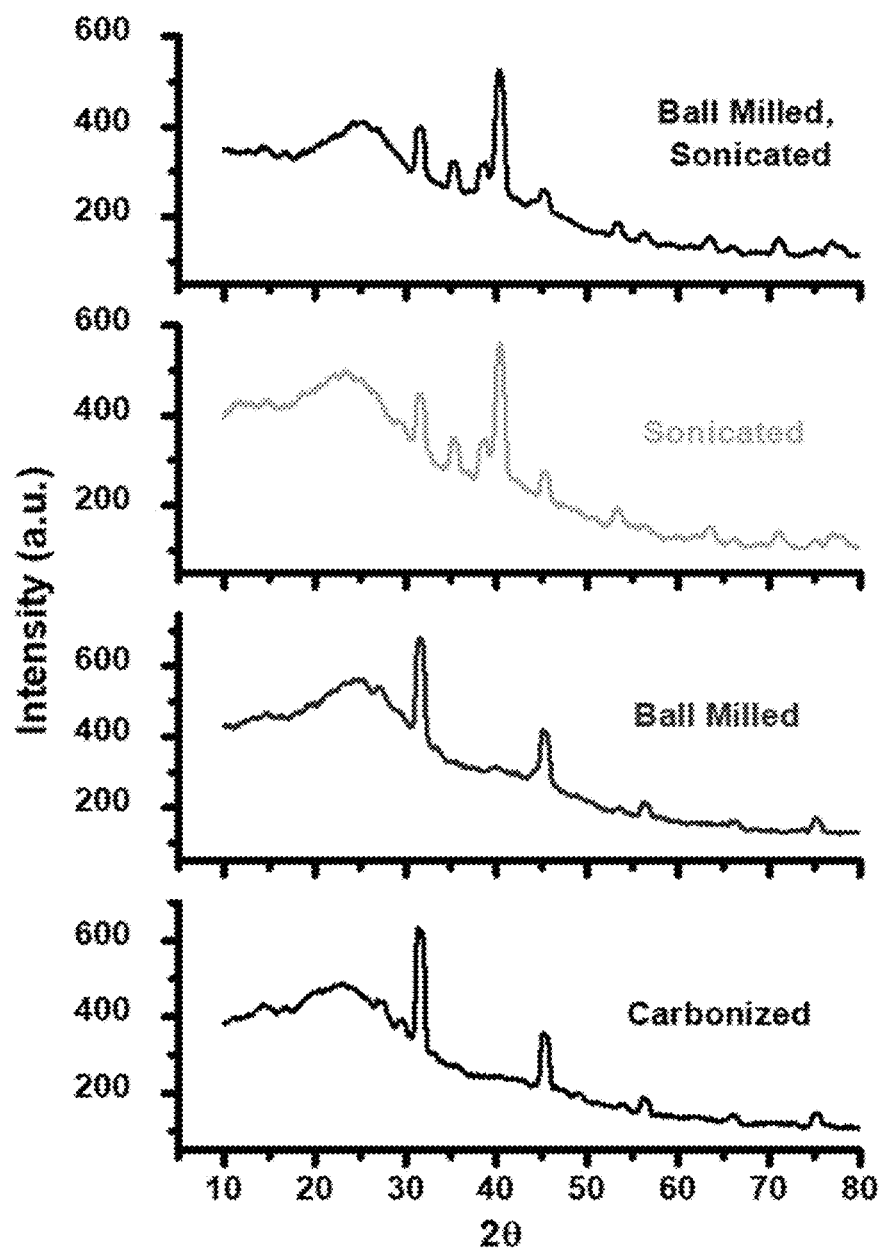
FIG. 10. XRD patterns of the carbonized, ball milled, sonicated and ball milled-sonicated palm dates fronds.

FIG. 10 shows the XRD patterns of the carbonized, ball milled, sonicated and ball milled-sonicated palm dates fronds. The observed peaks can be indexed as follows: The peak at around 24.8°, might be attributed to the (002) lattice planes of carbon [18]. The peak at 31.5 and 57 are of $CaMg(CO_3)_2$ [19] and that at 45.4° corresponding to the MgO [20]. The peak at 40.4 might be of trace elements/components released from the probe sonicator. In general, the observed pattern is mostly of graphitic structures.

Figures 11A, 11B:
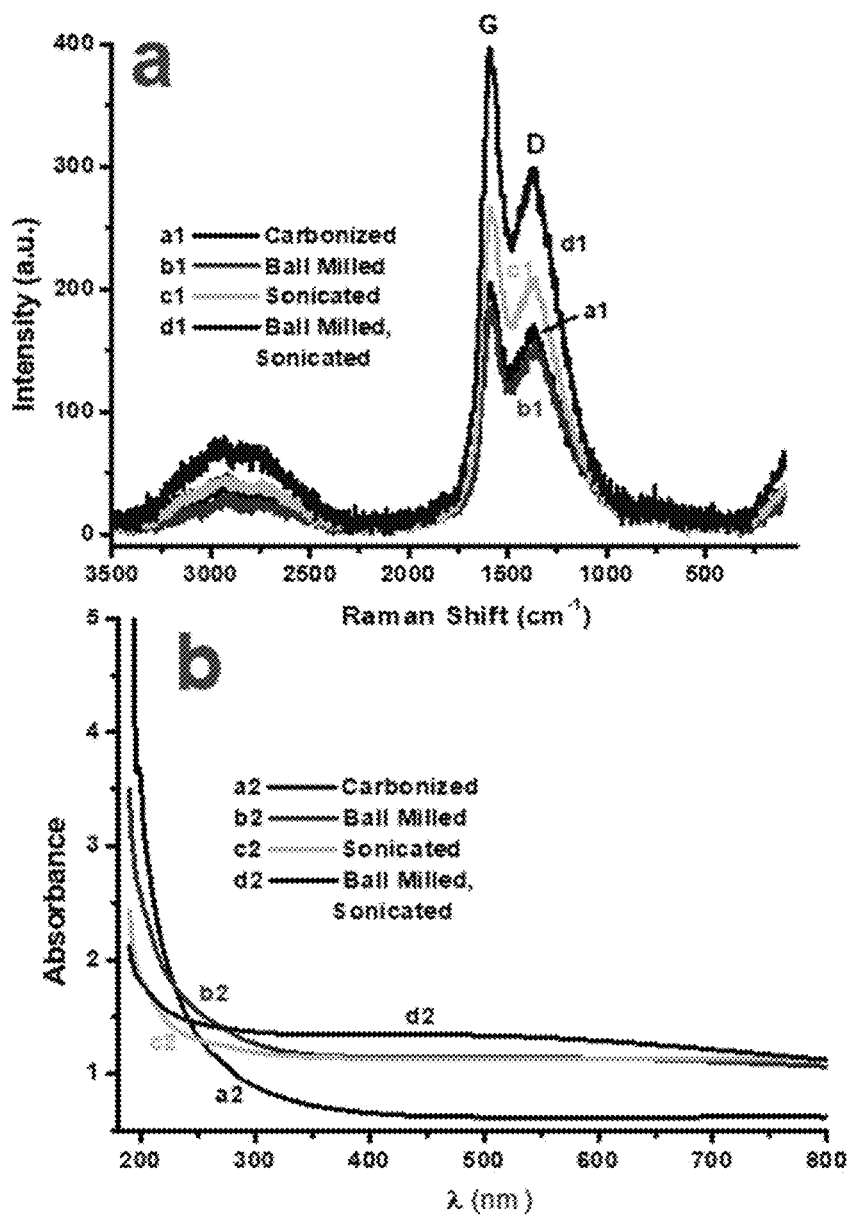
FIGS. 11A-B. Raman (a) and UV-visible absorption (b) spectra of the carbonized, ball milled, sonicated and ball milled-sonicated palm dates fronds.

FIG. 11 shows Raman (a) and UV-visible absorption (b) spectra of the carbonized, ball milled, sonicated and ball milled-sonicated palm dates fronds. The graphite (G) and defect (D) bands, which normally are observed in all graphitic carbons [21] are pronounced here as can be seen in Raman figure. They significantly increased in the sonicated and ball milled-sonicated samples. This means sonication could convert some of the $sp^3$ into $sp^2$ carbons. The UV-visible absorption spectra presented in (b) show strong photon absorption below 300 nm. But above 300 nm all the reduced sizes samples e.g. ball milled, sonicated, and ball milled-sonicated samples have increased photon absorption. This absorption is high in the visible range mainly in the ball milled, sonicated carbonized palm dates fronds. This might be due to the particle size reduction and improved graphitization.

Figure 12:
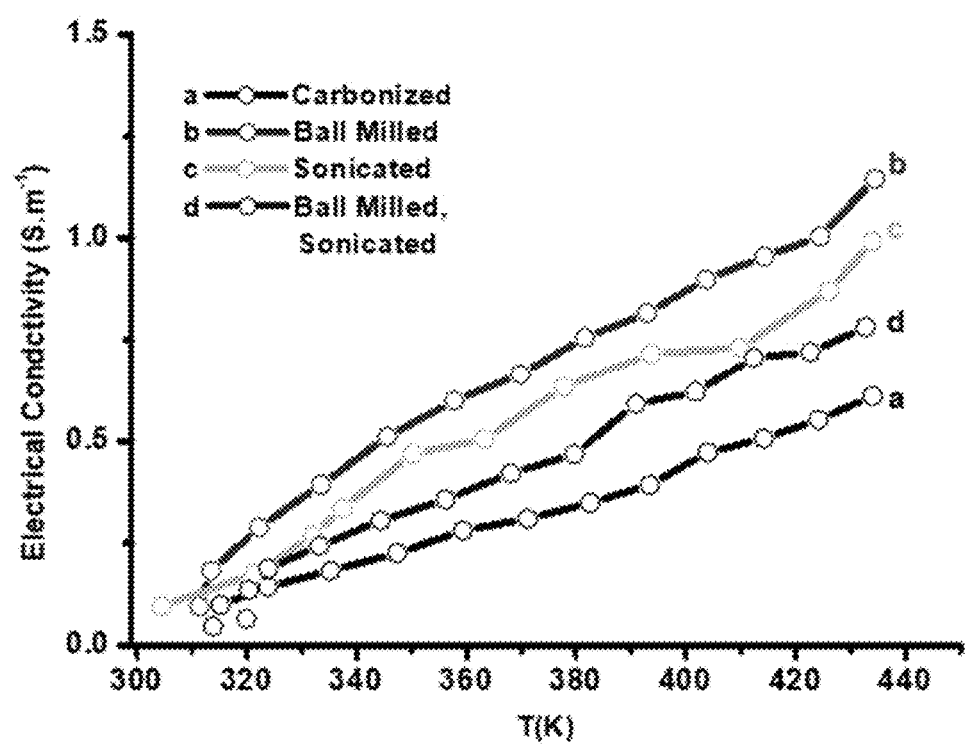
FIG. 12. Electrical conductivity as a function of temperature of the carbonized, ball milled, sonicated and ball milled-sonicated palm dates fronds.

FIG. 12 shows electrical conductivity as a function of temperature of the carbonized, ball milled, sonicated and ball milled-sonicated palm dates fronds. It can be seen that the electrical conductivity has been significantly increased in all the reduced size samples, which might be due to the improved graphitization. It is higher in the ball milled sample, which has higher amounts of trace elements compared with the sonicated samples. These trace elements in their ionic form might contribute to the electrical conductivity. It also can be observed that the conductivity increases with increasing the temperature. This behaviour is similar to the behaviours of semiconductors (like graphitic carbon) with temperature [22].

Conclusion

In this Example, high energy ball milling and sonication were found to be effective for providing fine nanostructures of carbonized palm dates frond. The produced nanostructures have improved graphitization and higher electrical conductivity than the carbonized sample. Recycling the palm dates fronds waste into valuable products is of great advantage environmentally and economically. These inexpensive, low toxic ultrafine carbon nanostructures can have tremendous applications such as in water treatment, filters and air purification, plastic and rubber additives, fuel and lubricated additives, energy storage, gas adsorption, fertilizers additives, valuable metals mining, bio imaging, drug delivery, etc.

REFERENCES

1. M. Jonoobi, M. shafie, Y. Shirmohammadli, A. Ashori, A Review on Date Palm Tree: Properties, Characterization and Its Potential Applications, Journal of Renewable Materials, 2019, vol. 7, no. 11, 1055-1075.
2. Khalid N Al-Redhaiman, Date Palm Cultivation in Saudi Arabia: Current Status and Future Prospects for Development, 2014 ASHS Annual Conference.
3. Salman Zafar, Date Palm as Biomass Resource, Jul. 12, 2019. (bioenergyconsult.com/date-palm-biomass).
4. Anna Deming, "King of the elements?". Nanotechnology. 21 (2010) 300201.
5. M-M. Titirici et al, Sustainable carbon materials, Chemical Society Reviews, October 2014, DOI: 10.1039/c4cs00232f.
6. Abdul Rahim Yacob, 2 Hassan M Al Swaidan, Phosphoric Acid Effect on Prepared Activated Carbon from Saudi Arabia's Date Frond Waste, Applied Mechanics and Materials Vols 110-116 (2012) pp 2124-2130.
7. A. F. Ahmad, G. A. ElChaghaby, Palm Fronds Activated Carbon for the Removal of Brilliant Green Dye from Wastewater, Water and Desalination Research Journal Vol. 2, No. 1; 2018.
8. Falah H. Hussein, Ahmed F. Halbus, Abbas J. Lafta, and Zahraa H. Athab, Preparation and Characterization of Activated Carbon from Iraqi Khestawy Date Palm, Journal of Chemistry, Volume 2015, Article ID 295748, 8 pages.
9. Ashfaq Ahmad, Hassan Mohammed Al-Swaidan, Ahmad Hamed Al-Ghamdi, Effect of different activating agents on the production of activated carbon from Raw Date Fronds of Saudi Palm Trees, Proc. of the Third Intl. Conf. Advances in Bio-Informatics, Bio-Technology and Envi- 10. Y. Liu and S. Kumar, "Polymer/carbon nanotube nano composite fibers-A review," ACS Applied Materials & Interfaces, vol. 6, no. 9, pp. 6069-6087, 2014.
11. L. S. Walker, V. R. Marotto, M. A. Rafiee, N. Koratkar, and E. L. Corral, "Toughening in graphene ceramic composites," ACS Nano, vol. 5, no. 4, pp. 3182-3190, 2011.
12. S. Parveen, S. Rana, and R. Fangueiro, "A review on nanomaterial dispersion, microstructure, and mechanical properties of carbon nanotube and nanofiber reinforced cementitious composites," Journal of Nanomaterials, vol. 2013, Article ID 710175, 19 pages, 2013.
13. S. J. Yan, S. L. Dai, X. Y. Zhang et al., "Investigating aluminum alloy reinforced by graphene nanoflakes," Materials Science and Engineering: A, vol. 612, pp. 440-444, 2014.
14. Rasoul Madannejad, et al., Toxicity of carbon-based nanomaterials: Reviewing recent reports in medical and biological systems, Chemico-Biological Interactions 307 (2019) 206-222.
15. Y. Zhao, B. Wang, W. Feng, C. Bai, Nanotoxicology: toxicological and biological activities of nanomaterials. Nanosci. Nanotechnol. (2012), pp. 1-53.
16. Oxana V. Kharissova and Boris I. Kharisov, Variations of interlayer spacing in carbon nanotubes. RSC Adv., 4 (2014) 30807-30815.
17. Humayun Kabir, et al. The $sp^2$-$sp^3$ carbon hybridization content of nanocrystalline graphite from pyrolyzed vegetable oil, comparison of electrochemistry and physical properties with other carbon forms and allotropes, Carbon 144 (2019) 831-840.
18. Michio Inagaki, Feiyu Kang, Materials Science and Engineering of Carbon:
Characterization, 2nd Edition, 2014, Elsevier Inc.
19. Zhan-fang Cao, Pei Chen, Fan Yang, Shuai Wang, Hong Zhong, Transforming structure of dolomite to enhance its ion-exchange capacity for copper(II), Colloids and Surfaces A: Physicochemical and Engineering Aspects 539 (2018) 201-208
20. Rashmi R. Devi et al., Defluoridation of water using nano-magnesium oxide. Journal of Experimental Nanoscience 9 (2014) 512-524.
21. Ruth Hinrichsa, Marcos Antonio Zen Vasconcellosb, Werner Österlec, Claudia Prietzelc. Amorphization of Graphite Flakes in Gray Cast Iron Under Tribological Load. Materials Research. 21 (2018) e20171000.
22. Ismail Karacan and Levent Erzurumluoglu, Formation of Non-graphitizing Carbon Fibers Prepared from Poly(p-phenylene terephthalamide) Precursor Fibers, Fibers and Polymers 16 (2015) 961-974.

While the invention has been described in terms of its preferred embodiments, those skilled in the art will recognize that the invention can be practiced with modification within the spirit and scope of the appended claims. Accordingly, the present invention should not be limited to the embodiments as described above, but should further include all modifications and equivalents thereof within the spirit and scope of the description provided herein.

We claim:

1. A method of producing carbon nanoparticles, comprising:
    milling carbonized date palm fronds to produce a milled powder;
    dispersing the milled powder in water to form a suspension, wherein the milled powder is present in the suspension in an amount of 10 g/L to 100 g/L;
    sonicating the suspension to form the carbon nanoparticles; and
    collecting the carbon nanoparticles,
    wherein the dispersing and sonicating steps are performed in water without organic solvents or chemical additives.

2. The method of claim 1, wherein the carbonized date palm fronds are milled for 1 to 10 hours.

3. The method of claim 1, wherein the sonication is performed with a probe sonicator at a power of 175 to 250 W.

4. The method of claim 1, wherein the sonication is performed for 1 to 5 hours.

5. The method of claim 1, wherein the carbon nanoparticles have a mean primary particle size of 50 to 150 nm.

6. The method of claim 1, wherein the carbon nanoparticles are crystalline and have a mean lattice spacing of 0.30 to 0.45 nm by transmission electron microscopy.

7. The method of claim 1, wherein the carbon nanoparticles have a ratio of $sp^2$ carbon to $sp^3$ carbon of 1:0.5 to 1:1.5 by XPS.

8. The method of claim 1, wherein the carbon nanoparticles comprise carbon, oxygen, and other elements selected from the group consisting of sodium, calcium, sulfur, chlorine, magnesium, and hydrogen.

9. The method of claim 8, wherein a sum of an amount of carbon present in the carbon nanoparticles and an amount of oxygen present in the carbon nanoparticles is greater than 95.75 atom % based on a total number of atoms in the carbon nanoparticles by X-ray photoelectron spectroscopy (XPS).

10. A method of producing carbon nanoparticles, comprising:
    milling carbonized date palm fronds to produce a milled powder;
    dispersing the milled powder in water to form a suspension;
    sonicating the suspension to form the carbon nanoparticles, wherein the sonication is performed with a probe sonicator at a power of 175 to 250 W; and
    collecting the carbon nanoparticles,
    wherein the dispersing and sonicating steps are performed in water without organic solvents or chemical additives.

11. The method of claim 10, wherein the carbonized date palm fronds are milled for 1 to 10 hours.

12. The method of claim 10, wherein the milled powder is present in the suspension in an amount of 10 g/L to 100 g/L.

13. The method of claim 10, wherein the sonication is performed for 1 to 5 hours.

14. The method of claim 10, wherein the carbon nanoparticles have a mean primary particle size of 50 to 150 nm.

15. The method of claim 10, wherein the carbon nanoparticles are crystalline and have a mean lattice spacing of 0.30 to 0.45 nm by transmission electron microscopy.

16. The method of claim 10, wherein the carbon nanoparticles have a ratio of $sp^2$ carbon to $sp^3$ carbon of 1:0.5 to 1:1.5 by XPS.

17. The method of claim 10, wherein the carbon nanoparticles comprise carbon, oxygen, and other elements selected from the group consisting of sodium, calcium, sulfur, chlorine, magnesium, and hydrogen.

18. The method of claim 17, wherein a sum of an amount of carbon present in the carbon nanoparticles and an amount of oxygen present in the carbon nanoparticles is greater than 95.75 atom % based on a total number of atoms in the carbon nanoparticles by X-ray photoelectron spectroscopy (XPS).

19. A method of producing carbon nanoparticles, comprising:

milling carbonized date palm fronds to produce a milled powder;

dispersing the milled powder in water to form a suspension;

sonicating the suspension to form the carbon nanoparticles; and collecting the carbon nanoparticles, wherein the dispersing and sonicating steps are performed in water without organic solvents or chemical additives and wherein the carbon nanoparticles have a mean primary particle size of 50 to 150 nm.

20. The method of claim 19, wherein the carbonized date palm fronds are milled for 1 to 10 hours.

21. The method of claim 19, wherein the milled powder is present in the suspension in an amount of 10 g/L to 100 g/L.

22. The method of claim 19, wherein the sonication is performed with a probe sonicator at a power of 175 to 250 W.

23. The method of claim 19, wherein the sonication is performed for 1 to 5 hours.

24. The method of claim 19, wherein the carbon nanoparticles are crystalline and have a mean lattice spacing of 0.30 to 0.45 nm by transmission electron microscopy.

25. The method of claim 19, wherein the carbon nanoparticles have a ratio of $sp^2$ carbon to $sp^3$ carbon of 1:0.5 to 1:1.5 by XPS.

26. The method of claim 19, wherein the carbon nanoparticles comprise carbon, oxygen, and other elements selected from the group consisting of sodium, calcium, sulfur, chlorine, magnesium, and hydrogen.

27. The method of claim 26, wherein a sum of an amount of carbon present in the carbon nanoparticles and an amount of oxygen present in the carbon nanoparticles is greater than 95.75 atom % based on a total number of atoms in the carbon nanoparticles by X-ray photoelectron spectroscopy (XPS).

* * * * *